(12) United States Patent
Chavan et al.

(10) Patent No.: US 10,810,208 B2
(45) Date of Patent: Oct. 20, 2020

(54) EFFICIENT EVALUATION OF QUERIES WITH MULTIPLE PREDICATE EXPRESSIONS

(71) Applicant: Oracle International Corporation, Redwood Shores, CA (US)

(72) Inventors: Shasank K. Chavan, Menlo Park, CA (US); Dennis Lui, San Jose, CA (US); Allison L Holloway, San Carlos, CA (US); Sheldon A. K. Lewis, Jallisco (MX)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 15/702,431

(22) Filed: Sep. 12, 2017

(65) Prior Publication Data
US 2018/0075105 A1    Mar. 15, 2018

Related U.S. Application Data

(60) Provisional application No. 62/393,181, filed on Sep. 12, 2016.

(51) Int. Cl.
*G06F 16/2455* (2019.01)
*G06F 16/22* (2019.01)
(Continued)

(52) U.S. Cl.
CPC ...... *G06F 16/24564* (2019.01); *G06F 16/221* (2019.01); *G06F 16/2237* (2019.01);
(Continued)

(58) Field of Classification Search
CPC . H04W 76/28; H04W 72/0446; H04W 36/38; H04W 74/0816; H04W 36/24;
(Continued)

(56) References Cited

U.S. PATENT DOCUMENTS 8,892,586 B2    11/2014 Lemke
9,251,210 B2    2/2016 Chaudhry et al.
(Continued)

OTHER PUBLICATIONS

Kemper, Optimizing Disjunctive Queries with Expensive Predicates, pp. 336-347 (Year: 1994).*
(Continued)

*Primary Examiner* — Albert M Phillips, III
(74) *Attorney, Agent, or Firm* — Hickman Palermo Becker Bingham LLP

(57) ABSTRACT

Techniques related to efficient evaluation of queries with multiple predicate expressions are disclosed. A first predicate expression (PE) is evaluated against a plurality of rows in a first column vector (CV) to determine that a subset of rows does not satisfy the first PE. The subset comprises less than all of the plurality of rows. When a query specifies the first PE in conjunction with a second PE, a selectivity of the first PE is determined. If the selectivity meets a threshold, the second PE is evaluated against all of the plurality of rows in a second CV. If the selectivity does not meet the threshold, the second PE is evaluated against only the subset of rows in the second CV. When a query specifies the first PE in disjunction with the second PE, the second PE may be evaluated against only the subset of rows in the second CV.

36 Claims, 10 Drawing Sheets

(51) Int. Cl.
*G06F 16/2458* (2019.01)
*G06F 16/2453* (2019.01)
*G06F 9/30* (2018.01)
*G06F 9/38* (2018.01)

(52) U.S. Cl.
CPC ...... *G06F 16/2282* (2019.01); *G06F 16/2455* (2019.01); *G06F 16/2456* (2019.01); *G06F 16/2462* (2019.01); *G06F 16/24537* (2019.01); *G06F 9/30018* (2013.01); *G06F 9/30036* (2013.01); *G06F 9/3887* (2013.01)

(58) Field of Classification Search
CPC ... H04L 47/38; H04L 47/32; G06F 16/24564; G06F 16/2456; G06F 16/221; G06F 16/2237; G06F 16/2282; G06F 16/2455; G06F 16/2462; G06F 16/24537; G06F 9/30018; G06F 9/30036; G06F 9/3887
See application file for complete search history.

(56) References Cited

U.S. PATENT DOCUMENTS

| | | | |
|---|---|---|---|
| 9,916,352 | B2 | 3/2018 | Chaudhry et al. |
| 2007/0174825 | A1 | 7/2007 | Eichenberger |
| 2009/0249026 | A1 | 10/2009 | Smelyanskiy |
| 2012/0078880 | A1 | 3/2012 | Steven et al. |
| 2013/0151568 | A1 | 6/2013 | Ellison |
| 2014/0067789 | A1* | 3/2014 | Ahmed ............ G06F 16/24544 707/714 |
| 2015/0088926 | A1* | 3/2015 | Chavan ................ G06F 16/221 707/769 |
| 2015/0089134 | A1* | 3/2015 | Mukherjee ........... G06F 16/221 711/114 |
| 2016/0070726 | A1 | 3/2016 | Macnicol et al. |
| 2016/0147833 | A1 | 5/2016 | Chaudhry et al. |
| 2017/0017683 | A1 | 1/2017 | Fourny et al. |
| 2017/0060587 | A1 | 3/2017 | Chavan |
| 2018/0075096 | A1 | 3/2018 | Chavan |
| 2019/0102412 | A1 | 4/2019 | Macnicol et al. |

OTHER PUBLICATIONS

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.

Christian Lemke et al., "Speeding Up Quries in Column Stores a Case for Compression", dated Sep. 2, 2010, 13 pages.

Abadi et al., "Integrating Compression and Execution in Column-Oriented Database Systems", SIGMOD 2006, Jun. 27-29, 2006, Chicago, Illinois, USA. Copyright 2006 ACM, 12 pages.

Chavan, U.S. Appl. No. 15/702,659, filed Sep. 12, 2017, Notice of Allowance 8 pages, dated Mar. 25, 2020.

Chavan, U.S. Appl. No. 15/702,526, filed Sep. 12, 2017, Notice of Allowance 7 pages, dated May 21, 2020.

\* cited by examiner

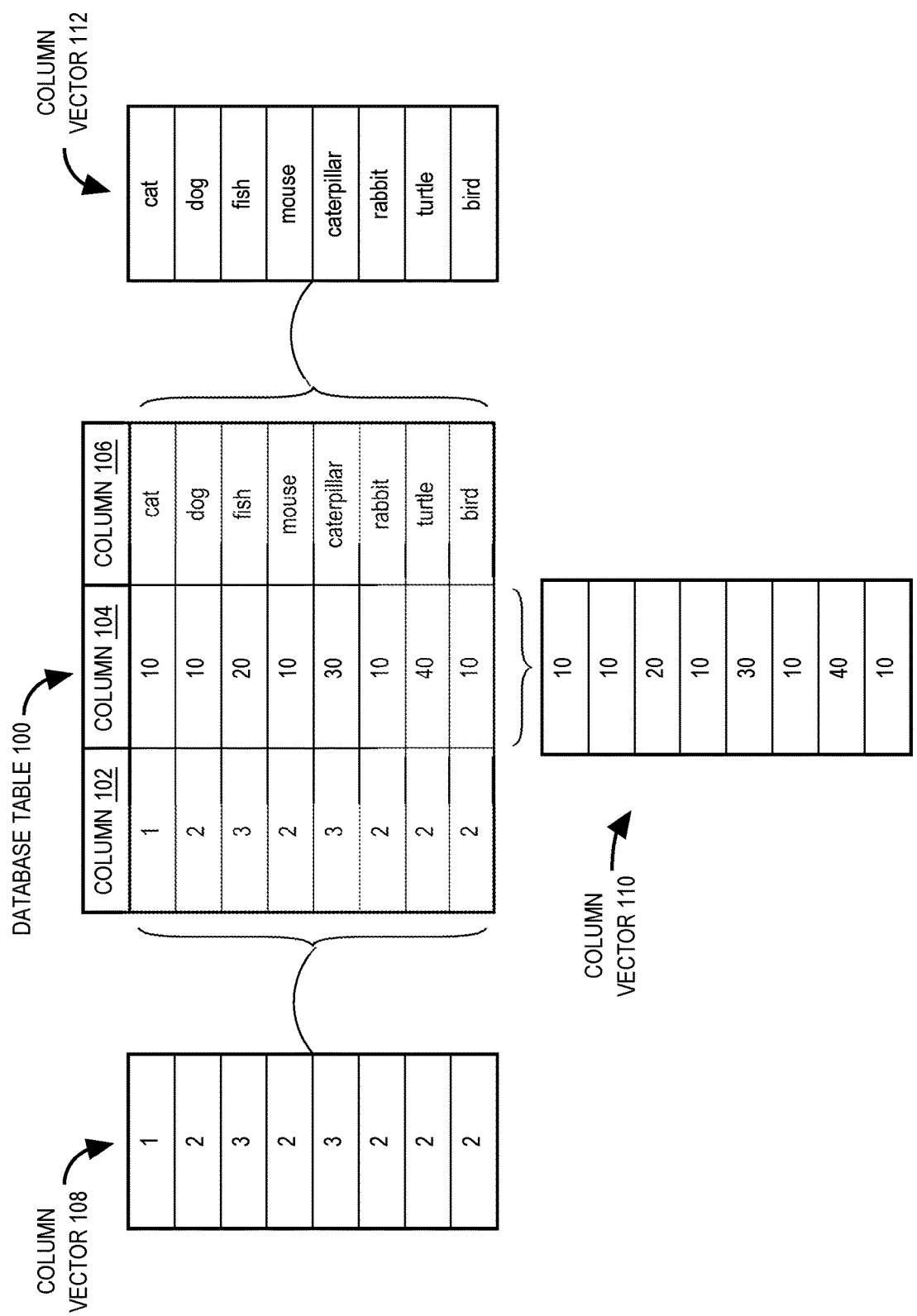

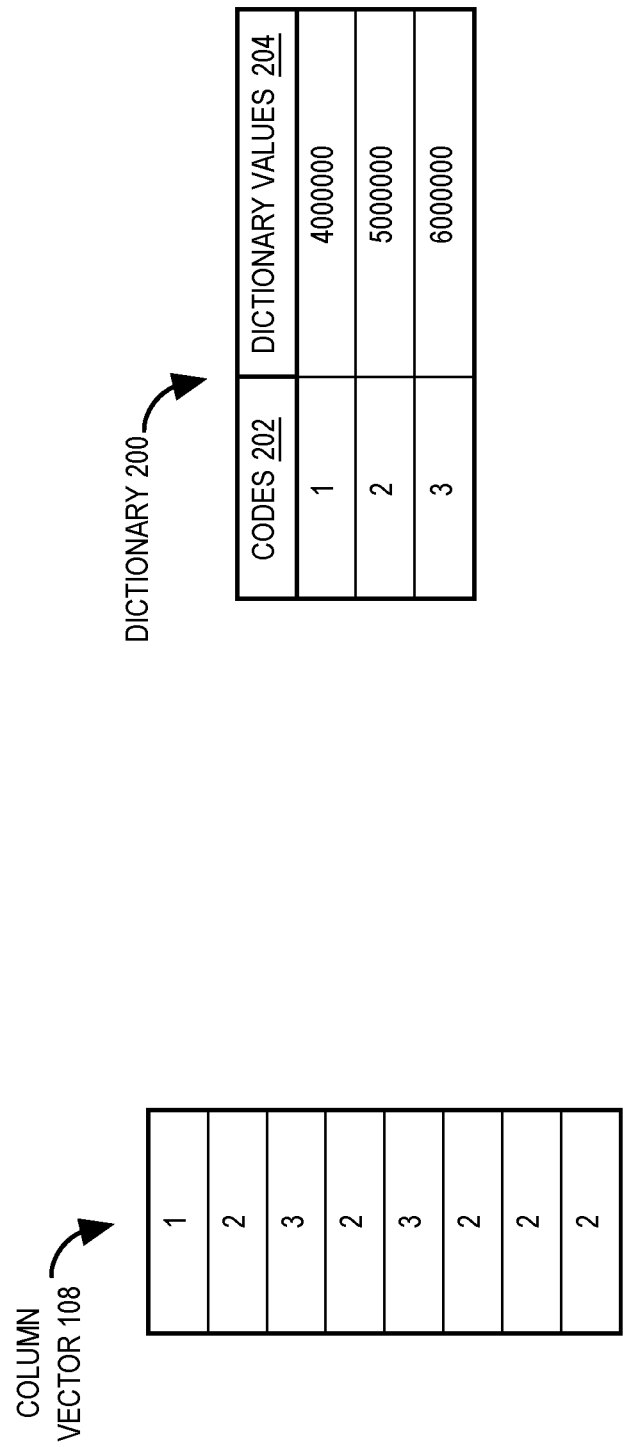

FIG. 4A

COLUMN VECTOR 108 → | 1 | 2 | 3 | 2 | 3 | 2 | 2 | 2 |

BIT VECTOR 400 → | 0 | 1 | 0 | 1 | 0 | 1 | 1 | 1 |

FIG. 4B

COLUMN VECTOR 110 → | 10 | 10 | 20 | 10 | 30 | 10 | 40 | 10 |

BIT VECTOR 402 → | 1 | 1 | 0 | 1 | 0 | 1 | 0 | 1 |

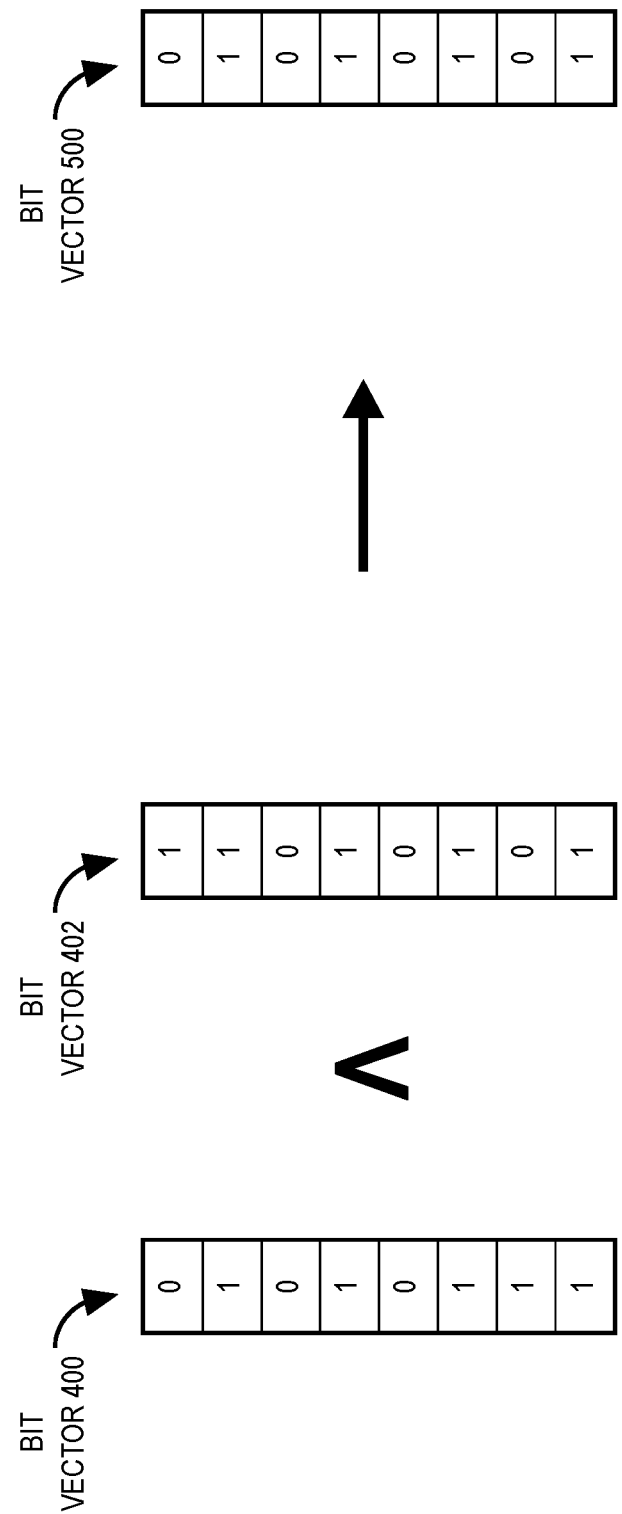

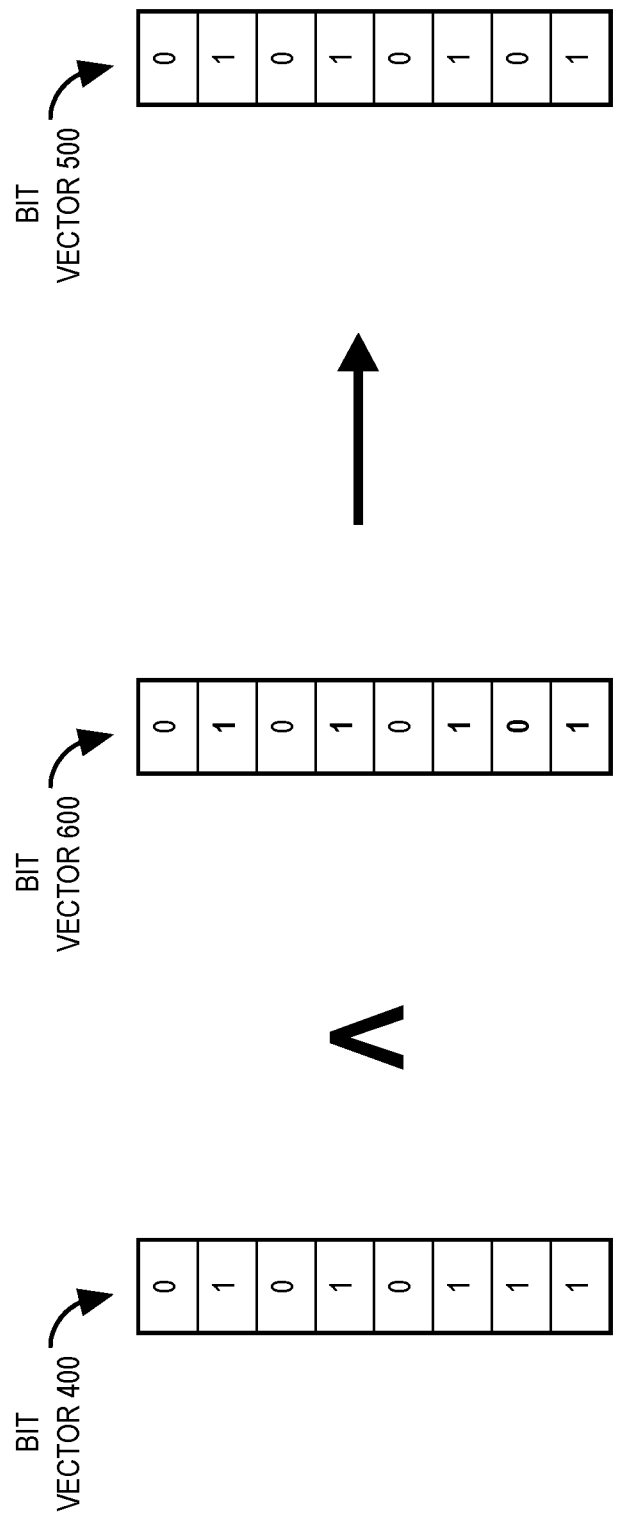

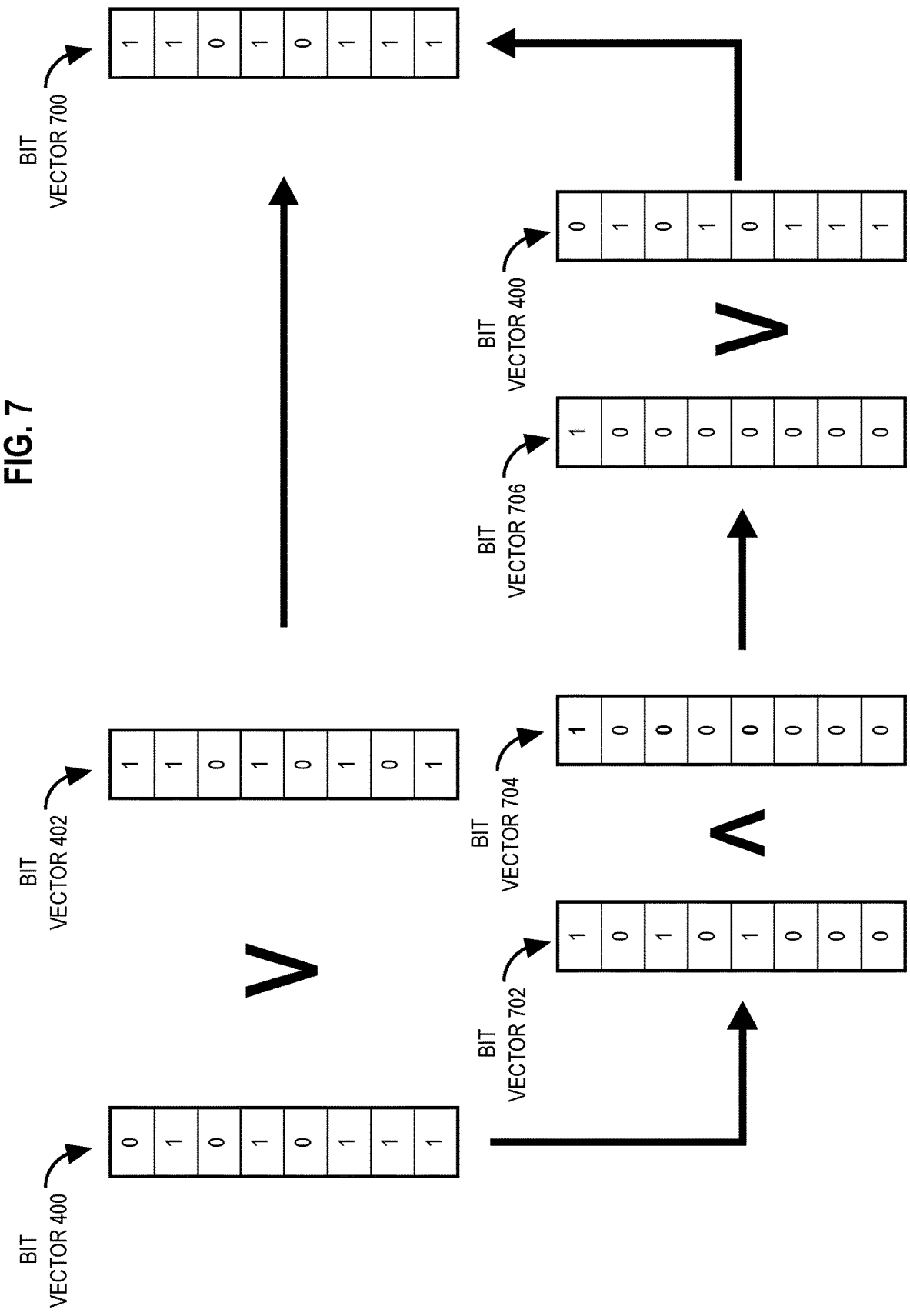

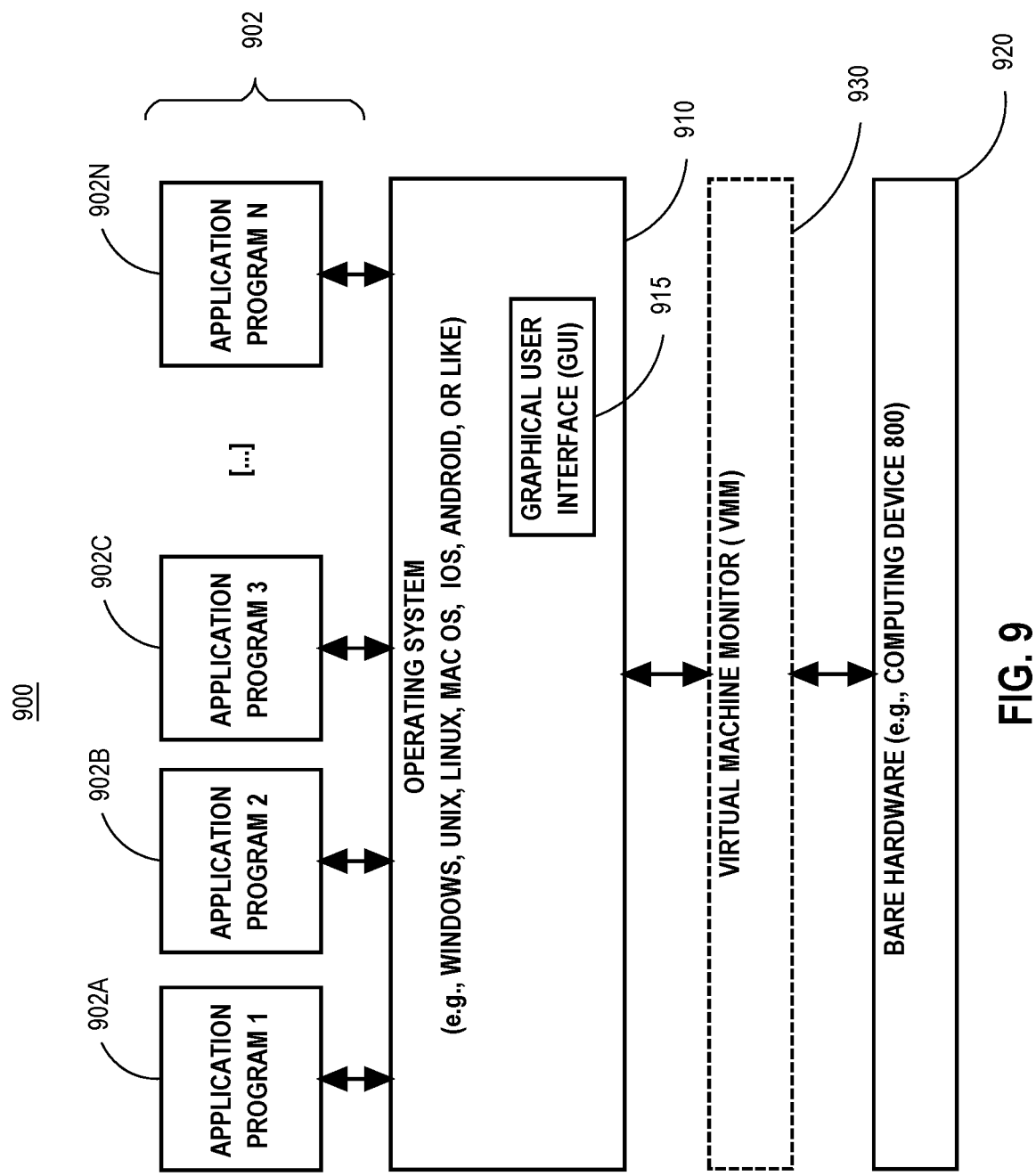

EFFICIENT EVALUATION OF QUERIES WITH MULTIPLE PREDICATE EXPRESSIONS

CROSS-REFERENCE TO RELATED APPLICATIONS; BENEFIT CLAIM

This application claims the benefit of Provisional Application No. 62/393,181, filed Sep. 12, 2016, the entire contents of which is hereby incorporated by reference as if fully set forth herein, under 35 U.S.C. § 119(e). This application is related to U.S. patent application Ser. No. 15/702,659 titled "EFFICIENT EVALUATION OF QUERY EXPRESSIONS INCLUDING GROUPING CLAUSES" and U.S. patent application Ser. No. 15/702,526 titled "EFFICIENT EVALUATION OF AGGREGATE FUNCTIONS", both of which are filed on Sep. 12, 2017, the entire contents of both of which are hereby incorporated by reference for all purposes as if fully set forth herein. This application is further related to Provisional Application No. 61/709,142 filed Oct. 2, 2012; U.S. patent application Ser. No. 14/023,064 filed Sep. 10, 2013; U.S. Pat. No. 9,697,174 issued Jul. 4, 2017; U.S. patent application Ser. No. 14/270,117 filed May 5, 2014; Provisional Application No. 61/801,207 filed Mar. 15, 2013, the entire contents of each of which are hereby incorporated by reference as if fully set forth herein.

TECHNICAL FIELD

Embodiments are generally related to information storage and retrieval technology. More specifically, embodiments are related to efficient evaluation of queries with multiple predicate expressions.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Columnar Database Data

To enable efficient evaluation of database queries, database tables may be stored in a column-major format. Database tables stored in this way are referred to herein as "columnar database data". In column-major format, a column for a subset of rows in a database table are stored contiguously (within a memory address space) within a column vector. As used herein, a column vector refers to a vector that stores one or more values of a column. Referring to FIG. 1, database table 100 comprises columns 102-106. Column vectors 108-112 store all or part of columns 102-106, respectively.

In column-major format, a row of values spans across a set of column vectors. However, each of the values in the row have the same element position within a respective column vector of the set of column vectors. For example, the first row of database table 100 includes the values "1", "10", and "cat" in columns 102-106, respectively. When database table 100 is represented as the set of column vectors 108-112, the values of the first row may be identified as the column values stored at index position "0" in each of column vectors 108, 110, and 112. Thus, the values "1", "10", and "cat" can be said to "correspond" with each other. As used herein, values of different column vectors are said to "correspond" with each other if they can share a row in a database table.

When the term "row" is used herein in reference to one or more column vectors, it may be referred to as a "column-major row". The term "row", when used herein in reference to a set of column vectors, refers to the set of column vector elements that have the same element position in each of the column vectors. Thus, the term "first row", when used in reference to column vectors 108, 110, and 112 together, refers to each of the column vector elements at index position "0". The term "row", when used herein in reference to a single column vector, refers to the column vector element corresponding to a particular row. Thus, the term "first row", when used in reference to column vector 108, refers to the column vector element at index "0" in column vector 108.

Columnar database data enables efficient processing of database data. Because the column values of a column are stored contiguously in memory, many kinds of database operations may be performed efficiently. For example, to evaluate a predicate based on a column, the column values may be retrieved more efficiently when stored contiguously in memory.

Compression

Typically, columnar database data is stored in a compressed format to conserve space in memory. Any number of various compression techniques may be used. For example, dictionary encoding is a lightweight compression technique that enables data to be stored using a relatively small number of bits. The relatively small number of bits corresponds to an encoded representation of the data and is hereinafter referred to as a "token code" or simply "code". Encoding and decoding are enabled based on maintaining a dictionary, which maps codes to dictionary values represented by the codes and vice versa. As used herein, an encoding dictionary encodes a domain of values for a column, a part of a column, or a column vector. Unless otherwise indicated, when it is said that a dictionary is for/associated with/corresponds to a column/a part of a column/a column vector, the domain of values of the dictionary are the values in the column/the part of the column/the column vector.

Referring to FIG. 2, dictionary 200 corresponds to column vector 108. Dictionary 200 comprises entries that map codes 202 to dictionary values 204. Codes 202 correspond to the distinct values of column vector 108. Dictionary values 204 include decoded representations of these distinct values. In other words, dictionary 200 encodes a domain of values comprising dictionary values 204. For example, instead of storing "4000000", column vector 108 stores "1", thereby conserving space in memory. Although, for the sake of clarity and ease of explanation, dictionary values 204 are depicted as a small datatype having only seven significant digits, in reality, dictionary values 204 is typically a very large datatype, such as ORACLE's number datatype, which can have up to thirty-eight significant digits.

Query Predicates

Some queries include a predicate that restricts the scope of the query result to database data satisfying certain conditions. As used herein, the restrictiveness of a predicate or a predicate expression is referred to as "selectivity", which may be expressed as a fraction, percentage, etc. of the total number of rows over which the predicate or the predicate expression is evaluated. For example, the query "SELECT column 102 FROM database table 100 WHERE column 104=10 AND column 106 LIKE '% cat %'" includes the predicate "WHERE column 104=10 AND column 106 LIKE '% cat %'". In this example, the scope of the query result is limited to values of column 102 that correspond to values of column 104 equal to "10" and that correspond to values of column 106 including the string pattern "cat". Notably, the example predicate includes a conjunction of multiple predicate expressions—"column 104=10" and "column 106 LIKE '% cat'". Referring to FIG. 1, the only row that satisfies both predicate expressions is the first row. Thus, the first value of column 102 would be returned, and the selectivity of the predicate would be 0.125.

Conjunctions of multiple predicate expressions may be evaluated more efficiently using a technique referred to herein as "selective predicate evaluation". Under selective predicate evaluation, the result of evaluating a predicate expression on a row dictates whether or not it is necessary to evaluate another predicate expression on the row. For example, a conjunction of predicate expressions may include a first predicate expression and a second predicate expression. If the result of evaluating the first predicate expression on a row is the Boolean value "False", then it is unnecessary to evaluate the second predicate expression on the row, because the conjunction of "False" with any other Boolean value will always evaluate to "False". On the other hand, if the result of evaluating the first predicate expression on the row is the Boolean value "True", then it is necessary to evaluate the second predicate expression on the row, because the result of evaluating the second predicate expression will determine whether the entire conjunction evaluates to "True" or "False". Thus, savings in computational overhead may be achieved based on using selective predicate evaluation to avoid unnecessary computation.

In the example of FIG. 1, only the first, second, fourth, sixth, and eighth rows of database table 100 satisfy the predicate expression "column 104=10", so these are the only rows that can satisfy the predicate expression "column 106 LIKE '% cat'" in addition to satisfying "column 104=10". Thus, it would be more efficient to avoid evaluating the third, fifth, and seventh values of column 106.

However, selective predicate evaluation may undercut the efficiency of columnar processing. Conceptually, columnar processing may be depicted as vertically traversing a column of data, whereas selective predicate evaluation may involve horizontal movement across columns of data. In other words, selective predicate evaluation may be viewed conceptually as interrupting the rapid vertical motion of columnar processing. For example, selective predicate evaluation may involve processing values of column 104 until a value that satisfies the predicate expression "column 104=10" is encountered, switching to evaluating the predicate expression "column 106 LIKE '% cat'" over the value of column 106 that corresponds to the value of column 104, and switching back to evaluating the predicate expression "column 104=10" over remaining values of column 104. Thus, selective predicate evaluation can significantly slow performance of columnar processing.

Described herein are novel techniques for evaluating, over columnar databases, multiple predicate expressions in a query, including predicate expressions that are in conjunction or disjunction with other predicate expressions of the multiple predicate expressions.

BRIEF DESCRIPTION OF THE DRAWINGS

In the drawings:
FIG. 1 depicts example columnar database data.
FIG. 2 depicts an example encoding dictionary.
FIGS. 4A-B depict example bit vectors indicating which column values satisfy a particular predicate expression.
FIG. 5 depicts an example approach for evaluating a conjunction of predicate expressions that are each evaluated over a respective column vector based on single instruction, multiple data (SIMD) processing.
FIG. 6 depicts an example approach for evaluating a conjunction of predicate expressions based on selective predicate evaluation.
FIG. 7 depicts an example approach for evaluating a disjunction of predicate expressions.
FIG. 9 depicts a software system for controlling the operation of the computer system.

Figure 3A:
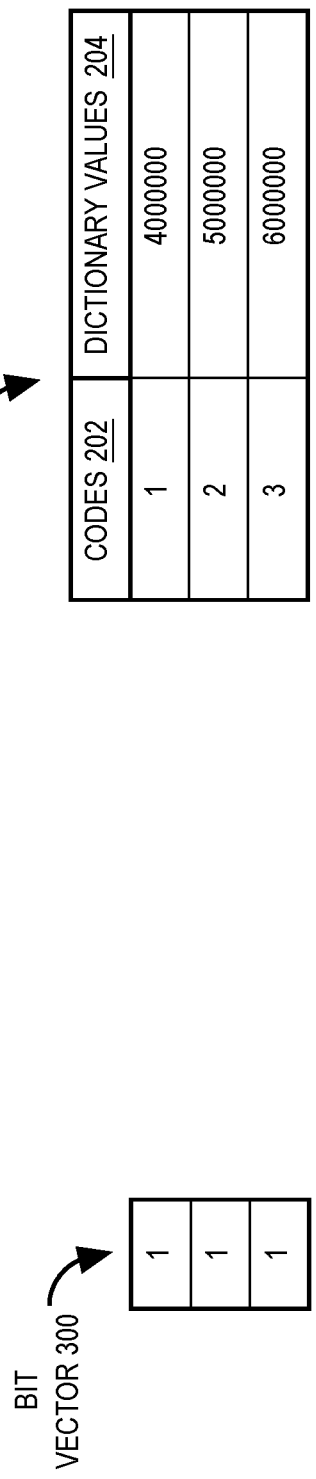
FIGS. 3A-B depict example dictionary filters.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" are used to differentiate elements and do not necessarily indicate any particular order.

Introduction

The embodiments disclosed herein are related to the efficient evaluation of queries with multiple predicate expressions over columnar database data using any number of a variety of techniques. Such techniques include dictionary filtering, selectivity thresholds, evaluating disjunctions of predicate expressions as conjunctions of predicate expressions, and determining an optimal order for evaluating predicate expressions.

One such technique involves performing selective predicate evaluation on columnar data based on generating bit vectors. To evaluate a conjunction of predicate expressions over columnar data using selective predicate evaluation, each predicate expression is evaluated sequentially against one or more respective column vectors, and the results of evaluating a predicate expression are stored in a bit vector. The set bits of a bit vector indicate which rows satisfied a particular predicate expression. Thus, when a subsequent predicate expression is evaluated against a column vector, the bit vector may be used to limit evaluation of the subsequent predicate expression to the rows of the column vector satisfying the particular predicate expression that preceded it.

However, depending on the selectivity of a previous predicate expression, it may still be faster to evaluate a subsequent predicate expression over an entire column vector using SIMD processing. In some embodiments, if the selectivity of the previous predicate expression meets certain threshold criteria (e.g., more than 3% of the values in a particular column vector satisfied the previous predicate expression), then SIMD processing is used to evaluate the subsequent predicate expression over an entire column vector; if the selectivity of the previous predicate expression does not meet the certain threshold criteria, then selective predicate evaluation is performed on the column vector. This approach to selective predicate evaluation is referred to herein as "conditional selective predicate evaluation".

Similarly, selective predicate evaluation, conditional or otherwise, may be used to evaluate a disjunction of multiple predicate expressions. At a high level, techniques for evaluating a conjunction may be used to evaluate a disjunction based on the Boolean Law "X OR Y=X OR (~X AND Y)". More specifically, a disjunction of a first predicate expression and a second predicate expression can be evaluated as if it includes a conjunction of the inverse of the first predicate expression and the second predicate expression. This can be implemented based on avoiding evaluation of the second predicate expression for a row if the row has been determined to satisfy the first predicate expression.

Evaluating a predicate expression against an encoded column vector may involve evaluating the predicate expression against an encoding dictionary. When a predicate expression is evaluated against an encoding dictionary, the predicate expression is actually evaluated against dictionary value(s) of the encoding dictionary to determine a set of one or more dictionary values that satisfy the predicate expression and, importantly, to determine a set of one or more codes that correspond to the set of one or more dictionary values. The encoded column vector is then scanned to determine which row(s) satisfy the predicate expression based on identifying which row(s) store a code that is included in the set of one or more codes. Importantly, evaluating the predicate expression against the encoding dictionary enables the predicate expression to be evaluated once for each dictionary entry in the encoding dictionary. In other words, the predicate expression may be evaluated at most once against each distinct value instead of being evaluated against multiple instances of a distinct value stored in the encoded column vector.

However, evaluating a predicate expression against dictionary values may involve a computationally intensive operation, such as a pattern matching operation or evaluation of a user-defined function. To avoid unnecessarily performing computationally intensive operations, "selective dictionary evaluation" may be used. Under selective dictionary evaluation, evaluating a conjunction of a first predicate expression and a second predicate expression involves using the results of evaluating the first predicate expression to determine a set of one or more dictionary values against which to evaluate the second predicate expression. More specifically, the results of evaluating the first predicate expression may be stored in a bit vector that is used to determine a set of one or more rows of an encoded column vector against which to evaluate the second predicate expression. In the encoded column vector, the set of one or more rows that satisfy the first predicate expression store a set of one or more codes which are mapped to a set of one or more dictionary values. To limit evaluation of the second predicate expression against only the set of one or more dictionary values corresponding to the rows that satisfy the first predicate expression, a dictionary filter is generated. The dictionary filter may be a bit vector indicating a set of one or more dictionary entries that store the set of one or more dictionary values. This may result in evaluating the second predicate expression against far fewer dictionary entries based on avoiding evaluation of the second predicate expression against any dictionary values excluded from the set of one or more dictionary values.

Predicate expressions may be evaluated in an optimal order that leverages selective predicate evaluation. A query optimizer may determine the optimal order at runtime based on a set of prioritized rules. For example, a first rule may specify that evaluating predicate expressions over compressed data should be performed before evaluating predicate expressions over uncompressed data. Additionally, a second rule may specify that evaluating predicate expressions over compressed data having a smaller number of distinct values should be performed before evaluating predicate expressions over compressed data having a larger number of distinct values. Furthermore, a third rule may specify that performing computationally intensive operations, such as evaluating complex functions, should be deferred as much as possible.

Query Execution Plans

A database server includes a query optimizer that enables determining an optimized query execution plan in response to receiving a query. A query optimizer may generate multiple valid query execution plans, each of which would produce a valid query answer if executed against a database. However, a query optimizer may select only one of the query execution plans for execution.

Typically, a query optimizer includes various components. An estimator component may compute the selectivity of all or part of a predicate and may estimate the costs of various database operations such as determining access paths, join methods, table scans, aggregations, communication between parallel processes, etc. A cost-based query transformation component may work in conjunction with the estimator component to enumerate and compare semantically equivalent forms of the query. The query optimizer may determine whether to perform transformations on a given query and may select an optimal access method and/or other database operations for the given query.

Dictionary Filtering

As mentioned above, dictionary filtering can be used to efficiently evaluate predicate expressions over compressed data. Typically, efficient evaluation of predicate expressions over compressed data involves evaluating the predicate expressions over dictionary entries instead of the actual values stored in a column vector and mapping back the results of evaluating the predicate expressions over the dictionary entries to the actual values stored in the column vector. The efficiency gain is based at least in part on reducing the number of decompressions involved in evaluating the predicate expressions over the compressed data. For example, referring to FIG. 2, evaluating the predicate expression "column 102=4000000" over each of the eight compressed values stored in column vector 108 would involve eight decompressions. In contrast, evaluating the predicate expression over each of the three entries of dictionary 200 would involve only three decompressions, because each distinct value of column vector 108 would be decompressed only once.

However, further efficiency can be gained based on using dictionary filtering to reduce the number of dictionary entries over which to evaluate a predicate expression. In some embodiments, it is unnecessary to evaluate a predicate expression over all entries of an encoding dictionary. For example, selective predicate evaluation may enable evaluating a predicate expression over less than all values of a column vector, thereby making it desirable to evaluate the predicate expression over less than all entries of an encoding dictionary in order to avoid unnecessary computational overhead. Thus, a dictionary filter may be used to determine whether or not to evaluate the predicate expression over a particular dictionary entry.

Figure 3B:
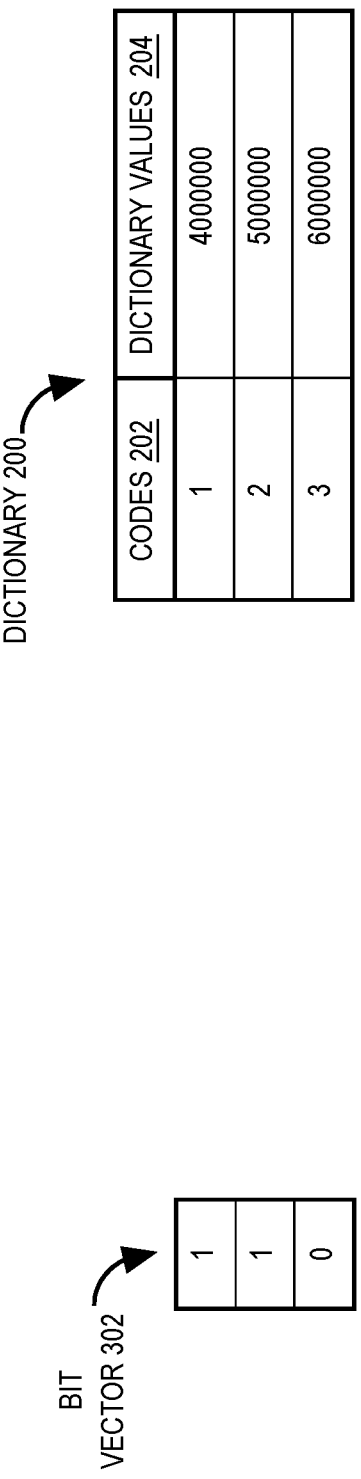

Referring to FIGS. 3A-B, bit vectors 300-302 are example implementations of dictionary filters. Bit vectors 300-302 are each indexed to dictionary 200. Thus, setting a bit in any of bit vectors 300-302 indicates that a corresponding token of dictionary 200 is stored in column vector 108. In some embodiments, bits may be set while scanning a column vector for tokens.

In the example of FIG. 3A, each bit of bit vector 300 is set, because a predicate expression is to be evaluated over all of column vector 108, which stores each token of dictionary 200. Thus, the predicate expression is evaluated over each decompressed token of dictionary 200, and the results of evaluating the predicate expression over dictionary 200 are mapped back to column vector 108. As will be described in detail below, mapping back the results may involve generating a bit vector that is indexed to column vector 108 and setting corresponding bits. For example, the results of evaluating the predicate expression "column 102=4000000" over dictionary 200 may indicate that the predicate expression is satisfied wherever the token "1" is stored in column vector 108. Since only the first value of column vector 108 is "1", only the bit corresponding to the first value of column vector 108 would be set.

However, in some embodiments, less than all bits of a dictionary filter are set. In the example of FIG. 3B, only the first two bits of bit vector 302 are set, so the predicate expression is evaluated over only the first two entries of dictionary 200. This may happen, for example, when selective predicate evaluation is used to reduce the number of values over which the predicate expression is to be evaluated. Suppose, for the sake of illustration, that the predicate expression "column 104=10" is evaluated prior to evaluating the predicate expression "column 102=4000000". Performing selective predicate evaluation to evaluate the conjuction of "column 104=10" and "column 102=4000000" would make it unnecessary to evaluate the third, fifth, and seventh values of column vector 108. Scanning the remaining values of column vector 108 may cause setting only the first two bits of bit vector 302, because the token "3" is absent from the remaining values. Thus, the predicate expression "column 102=4000000" would be evaluated over only the first two entries of dictionary 200.

Figure 3C:
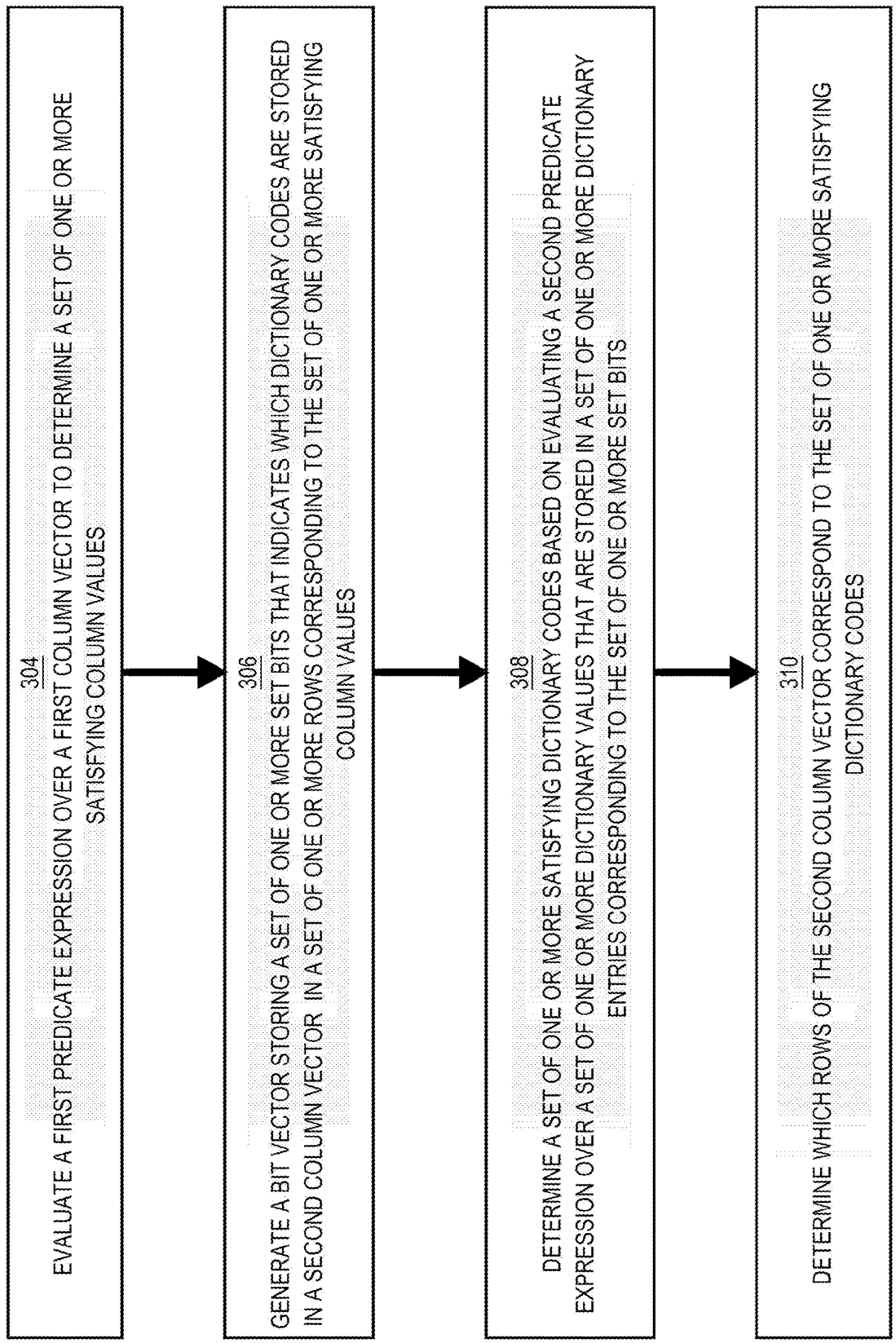
FIG. 3C is a flow diagram that depicts an example approach for evaluating a conjunction of predicate expressions based on dictionary filtering.

FIG. 3C provides an overview of a process for evaluating a conjunction of predicate expressions based on dictionary filtering. At block 304, a first predicate expression is evaluated over a first column vector to determine a set of one or more satisfying column values. For example, the predicate expression "column 104=10" may be evaluated over column vector 110 to determine a set of one or more satisfying column values comprising the first, second, fourth, sixth, and eighth values of column vector 110.

At block 306, a first bit vector is generated to indicate which column values of a second column vector correspond to the set of one or more satisfying column values. For example, the first bit vector may store a set of one or more set bits indicating that the dictionary codes "1" and "2" are stored in the first, second, fourth, sixth, and eighth rows of column vector 108.

At block 308, a set of one or more satisfying dictionary codes is determined. For example, the predicate expression "column 102=4000000" may be evaluated over the dictionary values corresponding to the dictionary codes "1" and "2" to determine that only the dictionary code "1" satisfies "column 102=4000000".

At block 310, a determination is made as to which column values of the second column vector store a satisfying dictionary code. For example, the dictionary code "1" may be mapped back to column vector 108 based on a second bit vector that is indexed to column vector 108. Each set bit may indicate that a particular row of the second bit vector stores the dictionary code "1".

Evaluating Combinations of Predicate Expressions

As mentioned above, the results of evaluating a predicate expression may be stored in a bit vector that is indexed to a column vector. The bit vector may store the results of evaluating the predicate expression over one or more dictionary entries or over all or part of a column vector. Referring to FIG. 4A, bit vector 400 stores bits indicating which values of column vector 108 satisfy the predicate expression "column 102=5000000". Likewise, in the example of FIG. 4B, bit vector 402 stores bits indicating which values of column vector 110 satisfy the predicate expression "column 104=10". A query predicate comprising a combination of these predicate expressions may be efficiently evaluated based on analyzing one or both of these bit vectors. In some embodiments, the query predicate may comprise a conjunction of predicate expressions. In some embodiments, the query predicate may comprise a disjunction of predicate expressions.

Conjunctive Expressions

A conjunction of predicate expressions may be efficiently evaluated over columnar database data using at least one of the following techniques—SIMD processing and selective predicate evaluation. SIMD processing is depicted in FIG. 5, and selective predicate evaluation is depicted in FIG. 6. As will be described in detail below, a selectivity threshold is used to determine which technique to employ.

Referring to FIG. 5, bit vector 500 is generated based on performing a Boolean AND operation on bit vectors 400-402. Bit vector 500 indicates which rows of database table 100 satisfy the conjunction of predicate expressions "column 102=5000000 AND column 104=10". Bit vectors 400-402 are each generated based on separately evaluating a respective predicate expression. Bit vector 400 stores the results of evaluating the first predicate expression "column 102=5000000" over each value of column vector 108, and bit vector 402 stores the results of evaluating the second predicate expression "column 104=10" over each value of column vector 110. Thus, the approach of FIG. 5 involves analyzing every value in column vectors 108-110.

SIMD processing may be used to efficiently analyze every value in column vectors 108-110. As mentioned above, SIMD processing leverages the column-major format of these values to analyze multiple values concurrently, but SIMD processing may involve some unnecessary computation. For example, according to the unset bits of bit vector 400, the first, third, and fifth values of column vector 108 failed to satisfy the first predicate expression "column 102=5000000", so it was unnecessary to evaluate the second predicate expression "column 104=10" over the first, third, and fifth values of column vector 110. In general, the greater the proportion of unset bits in bit vector 400, the greater the amount of wasted computation involved in performing SIMD processing to generate bit vector 402.

Employing selective predicate evaluation would avoid such unnecessary computations. Referring to FIG. 6, bit vector 500 is generated based on performing a Boolean AND operation on bit vectors 400 and 600. Bit vector 600 is generated based on employing selective predicate evaluation to evaluate the second predicate expression "column 104=10" over column vector 110. When selective predication evaluation is performed, any bits of bit vector 600 that correspond to an unset bit of bit vector 400 remain unset. Thus, the second predicate expression "column 104=10" is evaluated over only the values of column vector 110 that correspond to a set bit of bit vector 400. The results are stored as the corresponding bits of bit vector 600. For the sake of clarity, the bits of bit vector 600 that correspond to a set bit of bit vector 400 are bolded.

In some embodiments, performing the Boolean AND operation is unnecessary. This is because bit vector 600 is a subset of bit vector 400. Thus, the result of performing a Boolean AND operation on bit vectors 400 and 600 would yield bit vector 600 again.

However, as mentioned above, selective predicate evaluation may significantly slow performance of columnar processing. This is particularly the case when selective predicate evaluation is to be applied to a large proportion of column values. For example, generating bit vector 600 may involve scanning bit vector 400, which would be interrupted at almost every other bit in order to evaluate the second predicate expression "column 104=10" over select values of column vector 110.

In some embodiments, the drawbacks of SIMD processing and selective predicate evaluation are minimized based on using one technique or the other, but not both, to evaluate a predicate expression over a particular column vector. A selectivity threshold is used to determine which technique to use for the particular column vector. The selectivity threshold is a predetermined value that is compared to the proportion of values in a different column vector that satisfied an immediately preceding predicate expression.

For example, bit vector 400 indicates that 62.5% of the values in column vector 108 satisfy the first predicate expression "column 102=5000000". This percentage is compared to the selectivity threshold, which may be preset at 3%. Since 62.5% exceeds the selectivity threshold, it is determined that SIMD processing should be used to efficiently evaluate the second predicate expression "column 104=10" over column vector 110. However, if the selectivity threshold had not been exceeded, then it would have been determined that selective predicate evaluation should be used to efficiently evaluate the second predicate expression "column 104=10" over column vector 110.

The selectivity threshold may be adjusted periodically based on machine learning or some other heuristic. For example, based on how efficiently SIMD processing was used to evaluate a predicate expression previously, the selectivity threshold may be adjusted up or down. Efficiency may be determined based on feedback information, such as how long it previously took to evaluate a predicate expression over a column vector having a particular percentage of values that satisfied the predicate expression.

In some embodiments, selective predicate evaluation is combined with SIMD processing without suffering from the aforementioned drawbacks. However, this may involve adding an instruction to an existing instruction set architecture. For example, INTEL's AVX-512 instruction set supports SIMD operations involving mask bits. Thus, bit vector 400 may be used to determine which values of column vector 110 to load into a processor register, and SIMD processing may be performed on the values in the processor register.

Disjunctive Expressions

A disjunction of predicate expressions may be efficiently evaluated over columnar database data based on evaluating the disjunction as if it includes a conjunction of predicate expressions that enables the use of any number of the various techniques described herein. More specifically, a disjunction of a first predicate expression and a second predicate expression may be evaluated as if the disjunction includes a conjunction of the second predicate expression and the inverse of the first predicate expression. For example, FIG. 7 depicts an example approach for evaluating the disjunction "column 102=5000000 OR column 104=10" as "column 102=5000000 OR (column 102!=5000000 AND column 104=10)". This approach enables selective predicate evaluation, which is not generally used to evaluate disjunctions.

Typically, a disjunction of predicate expressions is evaluated based on separately evaluating each predicate expression and performing a Boolean OR operation on the results. Each predicate expression may be evaluated over every value in a respective column vector. Referring to FIG. 7, bit vectors 400-402 store the results of evaluating predicate expressions over column vectors 108-110, respectively. A Boolean OR operation is performed on bit vectors 400-402 to generate bit vector 700.

Although SIMD processing may be used to efficiently evaluate each predicate expression over a respective column vector, a significant amount of wasted computation is involved in this approach. For example, based on the set bits of bit vector 400, it was unnecessary to evaluate a predicate expression over the second, fourth, and sixth through eighth values of column vector 110. Selective predicate evaluation would enable avoiding such unnecessary computation, but selective predicate evaluation is at least theoretically incompatible with performing Boolean OR operations.

To enable selective predicate evaluation, a disjunction of predicate expressions may be evaluated, in part, as a conjunction of predicate expressions. In the example of FIG. 7, this involves generating bit vector 702 based on inverting the bits of bit vector 400. Advantageously, bit vector 702 enables selective predicate evaluation, because a conjunction of predicate expressions may be evaluated based on analyzing bit vector 702.

The conjunction of predicate expressions may be evaluated using any number of the various techniques described herein. In some embodiments, a selectivity threshold is used to determine whether it would be more efficient to employ SIMD processing to evaluate the second predicate expression "column 104=10" over each value of column vector 110 and/or to employ selective predicate evaluation to evaluate the second predicate expression over a subset (e.g., less than all values) of column vector 110. For example, selective predicate evaluation may be implemented using SIMD operations that apply a bit mask to a column vector.

Referring to FIG. 7, a Boolean AND operation is performed on bit vectors 702-704 to generate bit vector 706. Bit vector 704 is generated based on employing selective predicate evaluation. Thus, instead of performing SIMD processing to generate bit vector 402, selective predicate evaluation is used to evaluate only the column values corresponding to the bolded bits of bit vector 704.

As mentioned above with respect to FIG. 6, performing the Boolean AND operation on bit vectors 702-704 is unnecessary in some embodiments. This is because bit vector 704 is identical to bit vector 706.

Bit vector 706 stores the results of evaluating "~X AND Y". To complete evaluation of the disjunction as equivalent to "X OR (~X AND Y)", a Boolean OR operation is performed on bit vector 706 and bit vector 400. Bit vector 700 is generated based on performing the Boolean OR operation.

Ordered Evaluation of Expressions

In some embodiments, a query optimizer determines, at runtime, an optimal order for evaluating predicate expressions. In other words, the optimal order is determined while forming a query execution plan. The optimal order may be different from the order in which the predicate expressions appear in a query. For example, a query may include the predicate "WHERE column 104=10 AND SUBSTR(column 106)='cat' AND column 102=4000000". Using selective predicate evaluation, evaluating the predicate expressions in the order in which they are presented in the predicate would involve evaluating all eight values of column 104, evaluating the five values of column 106 corresponding to the rows that satisfied the previous expression, and evaluating the two values of column 102 corresponding to the rows that satisfied the previous expression. A total of fifteen values would be evaluated using this order. In contrast, evaluating the predicate expression "column 102=4000000", followed by the predicate expression "column 104=10", and then the predicate expression "SUBSTR(column 106)='cat'" would involve evaluating a total of only ten values, thereby achieving a savings in time and computational overhead.

The query optimizer may determine the optimal order based on a set of prioritized rules that take into consideration the time and/or computational overhead involved in evaluating a particular predicate expression over a particular column vector. For example, the first rule in the set of prioritized rules may have priority over subsequent rules and may specify that predicate expressions involving compressed data should be evaluated before predicate expressions involving uncompressed data. Thus, the predicate expression "column 102=4000000" would be evaluated before the predicate expression "column 104=10", because column 102 is compressed using dictionary 200. As will be described in detail below, dictionary filtering can be used to efficiently evaluate predicate expressions over compressed data. Furthermore, based on selective predicate evaluation, the results of evaluating a predicate expression over compressed data may reduce the amount of uncompressed data over which to evaluate another predicate expression.

Continuing with this example, the first rule may have a sub-rule specifying that evaluating predicate expressions over dictionaries having a relatively small number of distinct tokens before evaluating predicate expressions over dictionaries having a relatively large number of distinct tokens. For example, if Column A is encoded using a dictionary having five distinct tokens and Column B is encoded using a dictionary having three distinct tokens, then the predicate expression for Column B should be evaluated before the predicate expression for Column A. This is because dictionary filtering can be performed more quickly if there are fewer dictionary entries involved, and the results of evaluating the predicate expression for Column B may reduce the number of dictionary entries over which to evaluate the predicate expression for Column A based on selective predicate evaluation.

Yet another rule in the example set of prioritized rules may specify that predicate expressions involving relatively less computationally intensive operations should be evaluated before predicate expressions involving relatively more computationally intensive operations. For example, the predicate expression "SUBSTR(column 106)='cat'" involves a pattern matching operation, which is a more computationally intensive operation than the comparison operation involved in evaluating the predicate expression "column 104=10". Thus, it could be more efficient to evaluate the predicate expression "SUBSTR(column 106)='cat'" after evaluating the predicate expression "column 104=10", because selective predicate evaluation may reduce the number of column values over which to evaluate the predicate expression "SUBSTR(column 106)='cat'".

Upon determining the optimal order, the query optimizer generates a query execution plan based on the optimal order. The query execution plan enables a database server to efficiently evaluate a query with multiple predicate expressions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
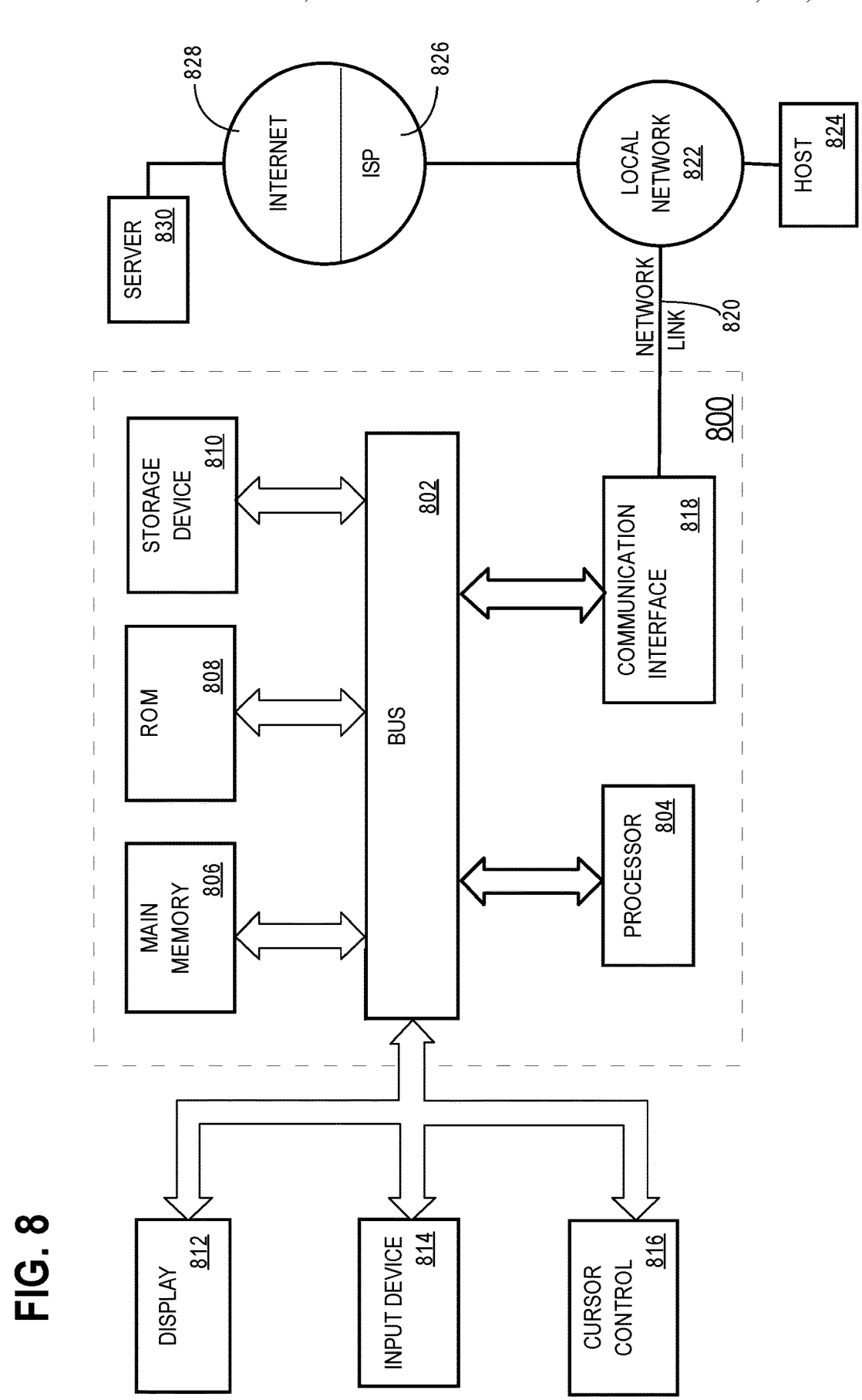
FIG. 8 depicts a computer system upon which embodiments may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:
1. A method, comprising:
for a plurality of rows, evaluating a first predicate expression against said plurality of rows, thereby determining that a subset of rows fails to satisfy said first predicate expression, wherein said subset of rows comprises less than all of said plurality of rows, wherein a query specifies a query predicate that includes said first predicate expression in disjunction with a second predicate expression; and after evaluating said first predicate expression against said plurality of rows, evaluating said second predicate expression only against said subset of rows; and prior to evaluating said first predicate expression against said plurality of rows, determining, at runtime, that said first predicate expression is to be evaluated before said second predicate expression based on a set of one or rules that include at least one of:
- a rule that specifies evaluating predicate expressions over compressed data before evaluating predicate expressions over uncompressed data, and
- a rule at specifies evaluating predicate expressions over dictionaries having a smaller number of distinct values before evaluating predicate expressions over dictionaries having a larger number of distinct values; and wherein the method is performed by one or more computing devices.

2. The method of claim 1, wherein evaluating said first predicate expression against said plurality of rows comprises evaluating said first predicate expression against said plurality of rows in a first column vector, and wherein evaluating said second predicate expression only against said subset of rows comprises evaluating said second predicate expression only against said subset of rows in a second column vector.

3. The method of claim 1, wherein evaluating said second predicate expression only against said subset of rows comprises:
- generating a bit vector that is indexed to a dictionary for a second column vector;
- setting, in said bit vector, a respective bit for each code in said dictionary that is stored in said subset of rows within said second column vector; and
- evaluating said second predicate expression over each entry in said dictionary that corresponds to a respective set bit in said bit vector.

4. The method of claim 1, wherein evaluating said second predicate expression only against said subset of rows comprises:
- generating a bit vector that is indexed to a first column vector;
- setting, in said bit vector, a respective bit for each value in said first column vector that is included in said subset of rows;
- determining that a proportion of set bits in said bit vector fails to exceed a threshold proportion; and
- in response to determining that said proportion of set bits in said bit vector fails to exceed said threshold proportion, using said bit vector to determine which values of a second column vector are included in said subset of rows.

5. The method of claim 1, wherein the set of one or more rules includes a rule that specifies evaluating predicate expressions involving less computationally intensive operations before evaluating predicate expressions involving more computationally intensive operations.

6. A method, comprising:
for a plurality of rows, evaluating a first predicate expression against said plurality of rows in a first column vector, thereby determining that a subset of rows satisfies said first predicate expression, wherein said subset of rows comprises less than all of said plurality of rows, wherein a query specifies a query predicate that includes said first predicate expression in conjunction with a second predicate expression; and after evaluating said first predicate expression against said plurality of rows, evaluating said second predicate expression only against said subset of rows in a second column vector; and wherein the method is performed by one or more computing devices.

7. The method of claim 6, further comprising:
determining a selectivity of said first predicate expression; and wherein said evaluating said second predicate expression only against said subset of rows in said second column vector is performed in response to determining that said selectivity does not exceed a threshold.

8. The method of claim 7, wherein determining said selectivity of said first predicate expression comprises:
- generating a bit vector that is indexed to said first column vector;
- setting, in said bit vector, a respective bit for each value in said first column vector that satisfies said first predicate expression; and
- determining a proportion of bits in said bit vector that are set.

9. The method of claim 8, wherein evaluating said second predicate expression only against said subset of rows in said second column vector comprises using said bit vector to determine which values of said second column vector are included in said subset of rows.

10. The method of claim 6, wherein evaluating said second predicate expression only against said subset of rows in said second column vector comprises:
- generating a bit vector that is indexed to a dictionary for said second column vector;
- setting, in said bit vector, a respective bit for each code in said dictionary that is stored in said second column vector; and
- evaluating said second predicate expression over each entry in said dictionary that corresponds to a respective set bit in said bit vector.

11. The method of claim 6, further comprising:
prior to evaluating said first predicate expression against said plurality of rows in said first column vector, determining, at runtime, that said first predicate expression is to be evaluated before said second predicate expression based on a rule that specifies evaluating predicate expressions over compressed data before evaluating predicate expressions over uncompressed data.

12. The method of claim 6, further comprising:
prior to evaluating said first predicate expression against said plurality of rows in said first column vector, determining, at runtime, that said first predicate expression is to be evaluated before said second predicate expression based on a rule that specifies evaluating predicate expressions over dictionaries having a smaller number of distinct values before evaluating predicate expressions over dictionaries having a larger number of distinct values.

13. The method of claim 6, further comprising:
prior to evaluating said first predicate expression against said plurality of rows in said first column vector, determining, at runtime, that said first predicate expression is to be evaluated before said second predicate expression based on a rule that specifies evaluating predicate expressions involving less computationally intensive operations before evaluating predicate expressions involving more computationally intensive operations.

14. A method, comprising:
for a plurality of rows, evaluating a first predicate expression against said plurality of rows in a first column vector, thereby determining that a subset of rows satisfies said first predicate expression, wherein said subset of rows comprises less than all of said plurality of rows, wherein a query specifies a query predicate that includes said first predicate expression in conjunction with a second predicate expression; and
after evaluating said first predicate expression against said plurality of rows:
  determining a set of one or more codes in said subset of rows in a second column vector that is encoded according to a dictionary, said dictionary comprising a plurality of entries for a domain of codes, each entry mapping a code of said domain of codes to a respective dictionary value of a plurality of dictionary values;
  making a determination of a set of one or more dictionary values that are mapped to said set of one or more codes by said dictionary; and
  in response to making said determination, evaluating said second predicate expression against said set of one or more dictionary values and forgoing evaluation of said second predicate expression against one or more other dictionary values excluded from said set of one or more dictionary values,
wherein the method is performed by one or more computing devices.

15. The method of claim 14, wherein evaluating said second predicate expression against said set of one or more dictionary values and forgoing evaluation of said second predicate expression against one or more other dictionary values excluded from said set of one or more dictionary values comprises:
  generating a bit vector that is indexed to said dictionary for said second column vector;
  setting, in said bit vector, a respective bit for each code in said dictionary that is stored in said second column vector; and
  evaluating said second predicate expression over each entry in said dictionary that corresponds to a respective set bit in said bit vector.

16. The method of claim 14, wherein determining said set of one or more codes in said subset of rows in said second column vector that is encoded according to said dictionary comprises:
  generating a bit vector that is indexed to said first column vector;
  setting, in said bit vector, a respective bit for each value in said first column vector that is included in said subset of rows;
  determining that a proportion of set bits in said bit vector fails to exceed a threshold proportion; and
  in response to determining that said proportion of set bits in said bit vector fails to exceed said threshold proportion, using said bit vector to determine which codes of said second column vector are included in said subset of rows.

17. The method of claim 14, further comprising:
prior to evaluating said first predicate expression against said plurality of rows in said first column vector, determining, at runtime, that said first predicate expression is to be evaluated before said second predicate expression based on a rule that specifies evaluating predicate expressions over dictionaries having a smaller number of distinct values before evaluating predicate expressions over dictionaries having a larger number of distinct values.

18. The method of claim 14, further comprising:
prior to evaluating said first predicate expression against said plurality of rows in said first column vector, determining, at runtime, that said first predicate expression is to be evaluated before said second predicate expression based on a rule that specifies evaluating predicate expressions involving less computationally intensive operations before evaluating predicate expressions involving more computationally intensive operations.

19. One or more non-transitory storage media storing one or more sequences of instructions, which when executed by one or more computing devices, cause:
for a plurality of rows, evaluating a first predicate expression against said plurality of rows, thereby determining that a subset of rows fails to satisfy said first predicate expression, wherein said subset of row comprises less than all of said plurality of rows, wherein a query specifies a query predicate that includes said first predicate expression in disjunction with a second predicate expression; and
after evaluating said first predicate expression against said plurality of rows, evaluating said second predicate expression only against said subset of rows; and
prior to evaluating said first predicate expression against said plurality of rows, determining, at runtime, that said first predicate expression is to be evaluated before said second predicate expression based on a set of one or rules that include at least one of:
  a rule that specifies evaluating predicate expressions over compressed data before evaluating predicate expressions over uncompressed data, and
  a rule that specifies evaluating predicate expressions over dictionaries having a smaller number of distinct values before evaluating predicate expressions over dictionaries having a larger number of distinct values.

20. The one or more non-transitory storage media of claim 19, wherein evaluating said first predicate expression against said plurality of rows comprises evaluating said first predicate expression against said plurality of rows in a first column vector, and wherein evaluating said second predicate expression only against said subset of rows comprises evaluating said second predicate expression only against said subset of rows in a second column vector.

21. The one or more non-transitory storage media of claim 19, wherein evaluating said second predicate expression only against said subset of rows comprises:
  generating a bit vector that is indexed to a dictionary for a second column vector;
  setting, in said bit vector, a respective bit for each code in said dictionary that is stored in said subset of rows within said second column vector; and
  evaluating said second predicate expression over each entry in said dictionary that corresponds to a respective set bit in said bit vector.

22. The one or more non-transitory storage media of claim 19, wherein evaluating said second predicate expression only against said subset of rows comprises:
  generating a bit vector that is indexed to a first column vector;

setting, in said bit vector, a respective bit for each value in said first column vector that is included in said subset of rows;
determining that a proportion of set bits in said bit vector fails to exceed a threshold proportion; and
in response to determining that said proportion of set bits in said bit vector fails to exceed said threshold proportion, using said bit vector to determine which values of a second column vector are included in said subset of rows.

23. The one or more non-transitory storage media of claim 19, wherein the set of one or more rules includes a rule that specifies evaluating predicate expressions involving less computationally intensive operations before evaluating predicate expressions involving more computationally intensive operations.

24. One or more non-transitory storage media storing one or more sequences of instructions, which when executed by one or more computing devices, cause:
for a plurality of rows, evaluating a first predicate expression against said plurality of rows in a first column vector, thereby determining that a subset of rows satisfies said first predicate expression, wherein said subset of rows comprises less than all of said plurality of rows, wherein a query specifies a query predicate that includes said first predicate expression in conjunction with a second predicate expression; and
after evaluating said first predicate expression against said plurality of rows, evaluating said second predicate expression only against said subset of rows in a second column vector.

25. The one or more non-transitory storage media of claim 24, wherein the one or more sequences of instructions include instructions that, when executed against said one or more computing devices, cause:
determining a selectivity of said first predicate expression; and
wherein said evaluating said second predicate expression only against said subset of rows in said second column vector is performed in response to determining that said selectivity does not exceed a threshold.

26. The one or more non-transitory storage media of claim 25, wherein determining said selectivity of said first predicate expression comprises:
generating a bit vector that is indexed to said first column vector;
setting, in said bit vector, a respective bit for each value in said first column vector that satisfies said first predicate expression; and
determining a proportion of bits in said bit vector that are set.

27. The one or more non-transitory storage media of claim 26, wherein evaluating said second predicate expression only against said subset of rows in said second column vector comprises using said bit vector to determine which values of said second column vector are included in said subset of rows.

28. The one or more non-transitory storage media of claim 24, wherein evaluating said second predicate expression only against said subset of rows in said second column vector comprises:
generating a bit vector that is indexed to a dictionary for said second column vector;
setting, in said bit vector, a respective bit for each code in said dictionary that is stored in said second column vector; and
evaluating said second predicate expression over each entry in said dictionary that corresponds to a respective set bit in said bit vector.

29. The one or more non-transitory storage media of claim 24, wherein the one or more sequences of instructions include instructions that, when executed against said one or more computing devices, cause:
prior to evaluating said first predicate expression against said plurality of rows in said first column vector, determining, at runtime, that said first predicate expression is to be evaluated before said second predicate expression based on a rule that specifies evaluating predicate expressions over compressed data before evaluating predicate expressions over uncompressed data.

30. The one or more non-transitory storage media of claim 24, wherein the one or more sequences of instructions include instructions that, when executed against said one or more computing devices, cause:
prior to evaluating said first predicate expression against said plurality of rows in said first column vector, determining, at runtime, that said first predicate expression is to be evaluated before said second predicate expression based on a rule that specifies evaluating predicate expressions over dictionaries having a smaller number of distinct values before evaluating predicate expressions over dictionaries having a larger number of distinct values.

31. The one or more non-transitory storage media of claim 24, wherein the one or more sequences of instructions include instructions that, when executed against said one or more computing devices, cause:
prior to evaluating said first predicate expression against said plurality of rows in said first column vector, determining, at runtime, that said first predicate expression is to be evaluated before said second predicate expression based on a rule that specifies evaluating predicate expressions involving less computationally intensive operations before evaluating predicate expressions involving more computationally intensive operations.

32. One or more non-transitory storage media storing one or more sequences of instructions, which when executed by one or more computing devices, cause:
for a plurality of rows, evaluating a first predicate expression against said plurality of rows in a first column vector, thereby determining that a subset of rows satisfies said first predicate expression, wherein said subset of rows comprises less than all of said plurality of rows, wherein a query specifies a query predicate that includes said first predicate expression in conjunction with a second predicate expression; and
after evaluating said first predicate expression against said plurality of rows:
determining a set of one or more codes in said subset of rows in a second column vector that is encoded according to a dictionary, said dictionary comprising a plurality of entries for a domain of codes, each entry mapping a code of said domain of codes to a respective dictionary value of a plurality of dictionary values;
making a determination of a set of one or more dictionary values that are mapped to said set of one or more codes by said dictionary; and
in response to making said determination, evaluating said second predicate expression against said set of one or more dictionary values and forgoing evaluation of said second predicate expression against one or more other dictionary values excluded from said set of one or more dictionary values.

33. The one or more non-transitory storage media of claim 32, wherein evaluating said second predicate expression against said set of one or more dictionary values and forgoing evaluation of said second predicate expression against one or more other dictionary values excluded from said set of one or more dictionary values comprises:
generating a bit vector that is indexed to said dictionary for said second column vector;
setting, in said bit vector, a respective bit for each code in said dictionary that is stored in said second column vector; and
evaluating said second predicate expression over each entry in said dictionary that corresponds to a respective set bit in said bit vector.

34. The one or more non-transitory storage media of claim 32, wherein determining said set of one or more codes in said subset of rows in said second column vector that is encoded according to said dictionary comprises:
generating a bit vector that is indexed to said first column vector;
setting, in said bit vector, a respective bit for each value in said first column vector that is included in said subset of rows;
determining that a proportion of set bits in said bit vector fails to exceed a threshold proportion; and
in response to determining that said proportion of set bits in said bit vector fails to exceed said threshold proportion, using said bit vector to determine which codes of said second column vector are included in said subset of rows.

35. The one or more non-transitory storage media of claim 32, wherein the one or more sequences of instructions include instructions that, when executed against said one or more computing devices, cause:
prior to evaluating said first predicate expression against said plurality of rows in said first column vector, determining, at runtime, that said first predicate expression is to be evaluated before said second predicate expression based on a rule that specifies evaluating predicate expressions over dictionaries having a smaller number of distinct values before evaluating predicate expressions over dictionaries having a larger number of distinct values.

36. The one or more non-transitory storage media of claim 32, wherein the one or more sequences of instructions include instructions that, when executed against said one or more computing devices, cause:
prior to evaluating said first predicate expression against said plurality of rows in said first column vector, determining, at runtime, that said first predicate expression is to be evaluated before said second predicate expression based on a rule that specifies evaluating predicate expressions involving less computationally intensive operations before evaluating predicate expressions involving more computationally intensive operations.

* * * * *

UNITED STATES PATENT AND TRADEMARK OFFICE
CERTIFICATE OF CORRECTION

PATENT NO. : 10,810,208 B2  
APPLICATION NO. : 15/702431  
DATED : October 20, 2020  
INVENTOR(S) : Chavan et al.

Page 1 of 1

It is certified that error appears in the above-identified patent and that said Letters Patent is hereby corrected as shown below:

On the Title Page

Page 2, Column 2, item [56], Line 5, delete "Quries" and insert -- Queries --, therefor.

In the Specification

Column 7, Lines 47-48, delete "conjuction" and insert -- conjunction --, therefor.

In the Claims

Column 17, Line 15, Claim 1, delete "at" and insert -- that --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*